United States Patent
Gawlik et al.

(10) Patent No.: US 7,272,475 B2
(45) Date of Patent: Sep. 18, 2007

(54) METHOD FOR UPDATING VEHICLE DIAGNOSTICS SOFTWARE

(75) Inventors: Thomas A. Gawlik, Rochester Hills, MI (US); Michael G. Zambo, Warren, MI (US)

(73) Assignee: General Motors Corporation, Detroit, MI (US)

( * ) Notice: Subject to any disclaimer, the term of this patent is extended or adjusted under 35 U.S.C. 154(b) by 258 days.

(21) Appl. No.: 11/002,607

(22) Filed: Dec. 2, 2004

(65) Prior Publication Data

US 2006/0122746 A1   Jun. 8, 2006

(51) Int. Cl.
   *G06F 7/00* (2006.01)
(52) U.S. Cl. ............ 701/29; 701/33; 701/35; 702/182; 702/183; 702/184
(58) Field of Classification Search ........... 701/29, 701/33, 35; 702/182–184
   See application file for complete search history.

(56) References Cited

U.S. PATENT DOCUMENTS

| | | | |
|---|---|---|---|
| 5,541,840 A * | 7/1996 | Gurne et al. ............ 701/33 |
| 5,555,498 A * | 9/1996 | Berra et al. ............. 701/33 |
| 5,916,286 A * | 6/1999 | Seashore et al. ......... 701/29 |
| 6,025,776 A * | 2/2000 | Matsuura ................ 340/438 |
| 6,181,992 B1 * | 1/2001 | Gurne et al. ............ 701/29 |
| 6,362,730 B2 * | 3/2002 | Razavi et al. ........... 340/438 |
| 6,470,288 B1 * | 10/2002 | Keidel et al. ........... 702/122 |
| 6,671,757 B1 * | 12/2003 | Multer et al. ........... 710/100 |
| 6,745,151 B2 * | 6/2004 | Marko et al. ........... 702/182 |
| 6,799,101 B2 * | 9/2004 | Hawig et al. ........... 701/35 |
| 6,807,469 B2 * | 10/2004 | Funkhouser et al. ..... 701/33 |
| 6,819,236 B2 * | 11/2004 | Kawai et al. .......... 340/539.24 |
| 6,842,676 B2 * | 1/2005 | Rodriguez .............. 701/29 |
| 6,956,501 B2 * | 10/2005 | Kitson ................. 340/870.07 |
| 7,007,041 B2 * | 2/2006 | Multer et al. .......... 707/201 |
| 7,092,803 B2 * | 8/2006 | Kapolka et al. ......... 701/29 |
| 7,209,813 B2 * | 4/2007 | Namaky ................ 701/29 |
| 2002/0033843 A1 * | 3/2002 | Loos et al. ............ 345/740 |
| 2002/0183904 A1 * | 12/2002 | Sakurai et al. ......... 701/33 |
| 2003/0041125 A1 * | 2/2003 | Salomon ............... 709/220 |
| 2005/0060124 A1 * | 3/2005 | Chen et al. ............ 702/185 |
| 2005/0065678 A1 * | 3/2005 | Smith et al. ........... 701/29 |

* cited by examiner

*Primary Examiner*—Thomas Black
*Assistant Examiner*—Wae Lenny Louie

(57) ABSTRACT

A method for updating vehicle diagnostics software via a telematics unit is based on the occurrence of a service event as detected by the telematics unit. Upon the connection of a vehicle diagnostics device to a vehicle, the telematics unit receives a scan tool configuration data and a vehicle code. The determination whether the scan tool configuration is current based on the vehicle code is made at the telematics unit. Based on the determination, the call center sends an updated scan tool configuration data to the telematics unit. The telematics unit offers the updated scan tool configuration data to the vehicle diagnostics device for reprogramming.

9 Claims, 3 Drawing Sheets

METHOD FOR UPDATING VEHICLE DIAGNOSTICS SOFTWARE

FIELD OF THE INVENTION

In general, the invention relates to diagnostics application software in a vehicle diagnostics device. More specifically, the invention relates to a method for updating vehicle diagnostics software via a telematics unit.

BACKGROUND OF THE INVENTION

Vehicle diagnosis pertains to self-diagnosis of an abnormality of an engine, a transmission, and the like. The on-board diagnosis (OBD) system is one example of this vehicle diagnostic system. The development of the OBD system was encouraged by the U.S. Environmental Protection Agency (EPA) as a means to better monitor engine and fuel management performance for cleaner exhaust emissions. Beginning with model year 1996, the EPA has required vehicle manufacturers to install OBD systems for monitoring the vehicle's electrical and mechanical systems. Currently, intelligence in the vehicle alerts the driver that repairs or scheduled maintenance is needed. In other words, these OBD systems are designed to perform diagnostics onboard the vehicle as it drives down the road and determine likely problem area possibilities. The diagnostic information of the vehicle is stored in memory as code corresponding to the failure or alert. At authorized service centers, these failures or alerts can be read by connecting an external engine diagnostic tool, commonly called a scan tool, to the vehicle via a diagnosis connector. Scan tools reveal what is stored within the vehicle. Today, scan tools can access data stream information, diagnostic trouble codes (DTCs), perform some functional tests, and capture freeze frame data, and so on. In the authorized service center, repair in response to the failure code is performed.

The rate of change in automotive systems is creating new and more difficult problems to tackle. For example, as vehicle computer systems, like the OBDs, become more and more complex there exists a need to continuously update the scan tool devices used to diagnose vehicle faults. Currently, the method of updating scan tool devices consists of mailing CDs to authorized service centers on regular intervals. Each of these authorized centers has to manually update each of the scan tools they possess. This introduces scheduling and human error, and will not always result in the most recent scan tool software being utilized during the diagnosis process.

Thus, there is a significant need for a method and system for updating vehicle scan tool devices diagnostics software such that human error is minimized. It is an object of this invention to provide such a method and system.

SUMMARY OF THE INVENTION

One aspect of the present invention provides a method for updating vehicle diagnostics software. The method includes receiving a scan tool configuration data from a scan tool device and sending a vehicle code to a call center. A determination is made, at the telematics unit, whether the scan tool configuration is current based on the vehicle code at the call center. Additionally, the method includes the call center sending an updated scan tool configuration data to the telematics unit based on the determination.

Another aspect of the present invention provides a computer usable medium including computer program code for updating vehicle diagnostics software. The medium includes computer program code for a telematics unit receiving a scan tool configuration data from a scan tool device and sending a vehicle code to a call center. The medium further includes computer program code for determining at the telematics unit, whether the scan tool configuration is current based on the vehicle code at the call center. Additionally, the medium includes computer program code for sending an updated scan tool configuration data from the call center to the telematics unit based on the determination. The computer usable medium further comprises computer program code for updating the scan tool vehicle diagnostics software.

Another aspect of the present invention provides a system including means for updating vehicle diagnostics software. The system includes means for receiving a scan tool configuration data from a scan tool device and sending a vehicle code to a call center. The system further includes means for determining, at the telematics unit, whether the scan tool configuration is current based on the vehicle code at the call center. Additionally, the system includes means for sending an updated scan tool configuration data from the call center to the telematics unit based on the determination. The system further comprises means for updating the scan tool vehicle diagnostics software.

The foregoing forms and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
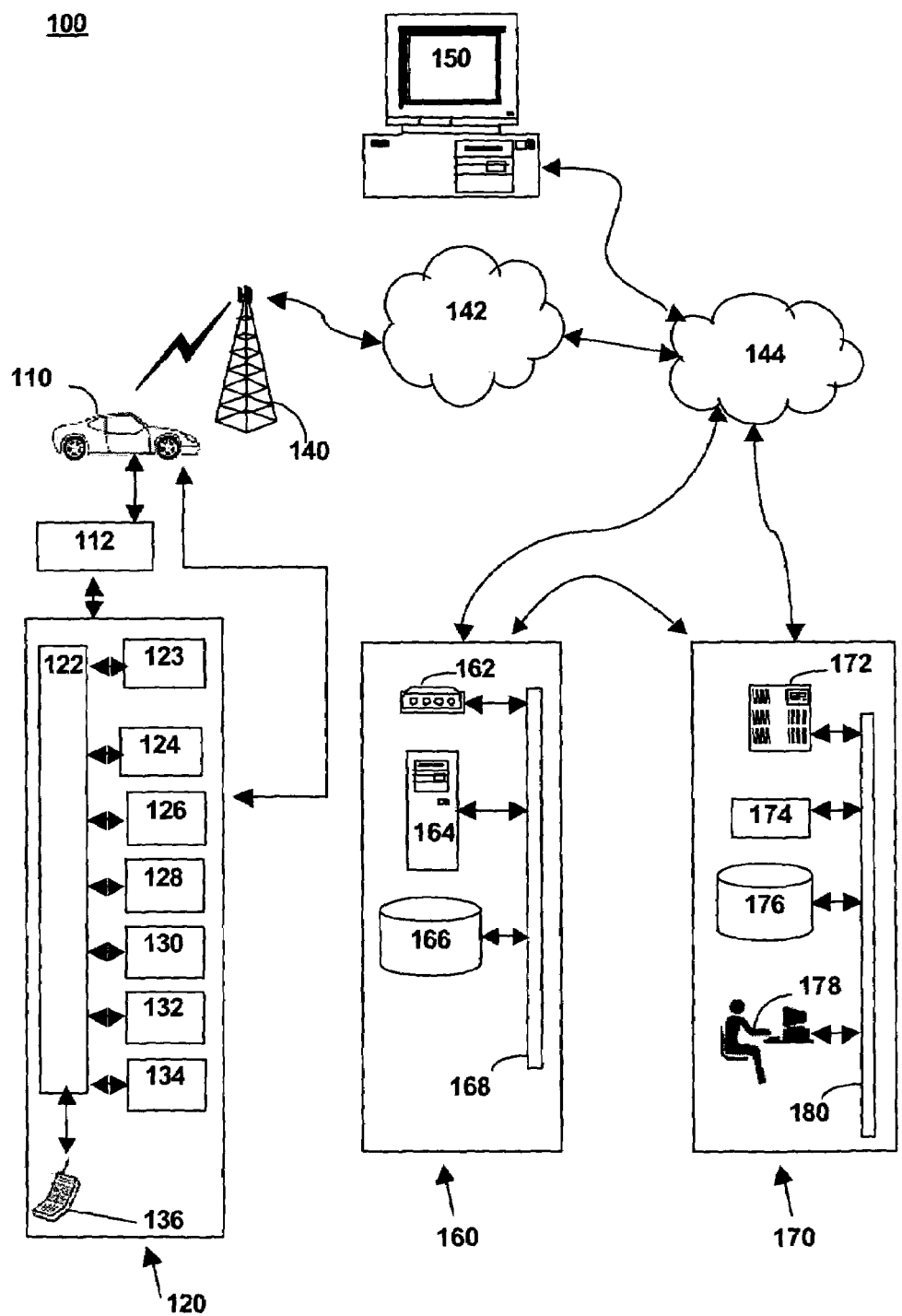
FIG. 1 is a schematic diagram of one embodiment of a system for updating vehicle diagnostics software in accordance with the present invention.

FIG. 1 illustrates one embodiment of a motor vehicle communication system (MVCS) for updating vehicle diagnostics software in accordance with the present invention at 100. MVCS 100 includes a mobile vehicle communication unit (MVCU) 110; a vehicle communication network 112; a telematics unit 120; one or more wireless carrier systems 140; one or more communication networks 142; one or more land networks 144; one or more client, personal, or user computers 150; one or more web-hosting portals 160; and one or more call centers 170. In one embodiment, MVCU 110 is implemented as a mobile vehicle equipped with suitable hardware and software for transmitting and receiving voice and data communications. In an example, a display is embedded in MVCU 110. The display is a dialed digital display such as a radio unit, radio head or an instrument panel. MVCS 100 may include additional components not relevant to the present discussion.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

Vehicle communication network 112 routes signals between various units or modules of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110 is connected to a vehicle diagnostics device, known in the art as a scan tool device 190, to reveal fault code stored within the vehicle memory. In one embodiment of the invention, the MVCU 110 is connected to a scan tool device 190 via a data link connector. In another embodiment, scan tool device 190 communicates with the MVCU 110 via serial bus interface. In one embodiment, a scan tool device 190 is a device configured to communicate and interact with vehicle components or modules to determine the existence of any reported Diagnostic Trouble Code ("DTC") or other data relating to module performance or behavior.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to an in-vehicle audio speech-generating source 123, a wireless modem 124, a global positioning system (GPS) unit 126, an in-vehicle memory 128, a microphone 130, one or more speakers 132, source device 134, and an embedded or in-vehicle mobile phone 136. In other embodiments, telematics unit 120 may be implemented without one or more of the above listed components such as, for example, speakers 132. Telematics unit 120 may include additional components not relevant to the present discussion. In one embodiment, source device 134 is a CD player, terrestrial radio receiver, satellite radio receiver, DVD player, MP3 player, a media player, or other entertainment device. In one embodiment, source device 134 is within MVCU 110. In yet another embodiment, source input is remote from the MVCU 110, and is in communication with MVCU 110 via a wireless connection.

In one embodiment, processor 122 is implemented as a microcontroller, microprocessor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 136 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 can reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends data transmissions to or receives data transmissions from one or more databases 166 via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180. In one embodiment, communication services databases 176 are implemented as scan tool databases.

Switch 172 of call center 170 connects to land network 144. Switch 172 transmits voice or data transmissions from call center 170 and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends data transmissions to or receives data transmissions from one or more communication services databases 176 via network system 180. Communication services manager 174 sends data transmissions to or receives data transmissions from one or more communication services advisors 178 via network system 180. Communication services database 176 sends data transmissions to or receives data transmissions from communication services advisor 178 via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one embodiment, communication services database 176 is a scan tool database. In an example, a scan tool database sends data transmissions to or receives data transmissions from telematics unit 120 in MVCU 110. Scan tool configuration data and/or vehicle code is transmitted to telematics unit 120.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144, and web-hosting portals 160 using voice transmissions. In an alternative embodiment, communication services manager 174 communicates with telematics unit 120 in MVCU 110 through wireless carrier system 140, communication network 142, land network 144, and web hosting portals 160 using voice transmissions. Switch 172 selects between voice transmissions and data transmissions.

Scan tool device 190, telematics unit 120, and call center 170 are configured to implement the updated diagnostics software methods of the present invention as will be described in connection with FIGS. 2 and 3. In one embodiment, scan tool device 190 has a preference setting to auto-accept or to require operator input to accept diagnostics software upgrades. In another embodiment, the diagnostics software upgrades is specific to MVCU 110 being serviced or is the diagnostics software upgrades is for multiple vehicle applications.

Figure 2:
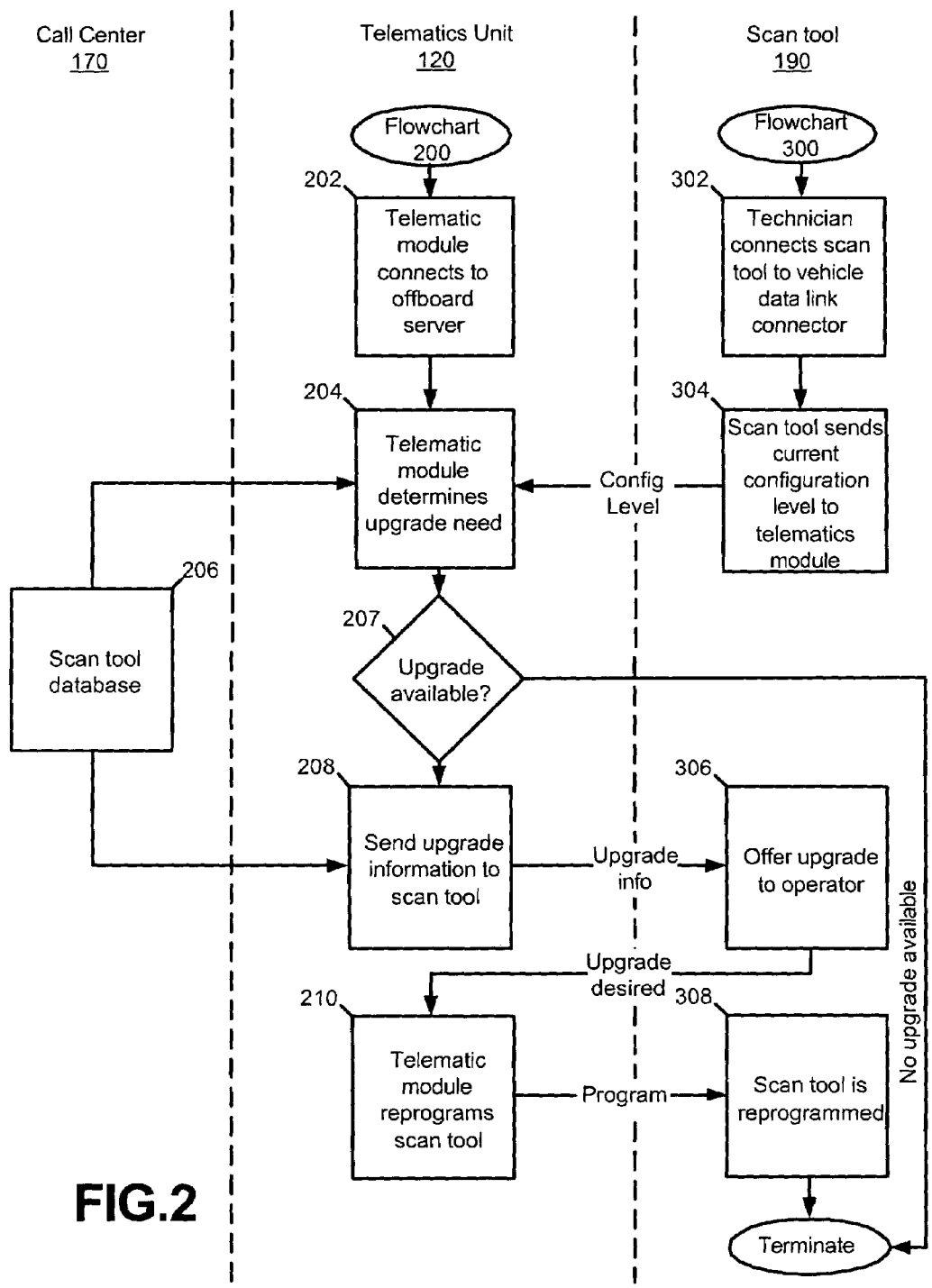
FIG. 2 is a flowchart representative of one embodiment of a method for updating vehicle diagnostics software in accordance with the present invention.

FIG. 2 illustrates a flowchart 200 and a flowchart 300 that are executed by telematics unit 120 and scan tool device 190, respectively, in implementing an automated diagnostics software update method of the present invention. While in practice, diagnostic software update process can be initiated by telematics unit 120 or scan tool device 190, flowcharts 200 and 300 will be described herein as if telematics unit 120 has initiated the service event. Flowchart 200 begins at step 202.

At step 202, flowchart 200 monitors a wireless connection between a telematics module or telematics unit (e.g. telematics unit 120 of FIG. 1) and an off board server or a call center (e.g. call center 170 of FIG. 1) for a data input. The wireless connection may be established by sending a connection request from the telematics unit to the call center, or by sending a connection request from the call center to the telematics unit. The wireless connection uses wireless carrier system 140 in one embodiment. In another embodiment, monitoring the wireless connection is initiated at the telematics unit in response to an established connection. In another embodiment, monitoring the wireless connection is initiated by a monitor request issued by a user in MVCU 110 or an advisor (e.g. advisor 168). In yet another embodiment, the wireless connection is monitored in response to a button push.

At step 302, flowchart 300 connects a scan tool device (e.g. scan tool device 190 of FIG. 1) and a MVCU (e.g. MVCU 110 of FIG. 1) via a data link connector, or the like. At step 304, scan tool device 190 sends current configuration level to telematics unit 120. In one embodiment, the configuration level contains specific, up-to-date parameters required to correctly communicate with and interpret specific vehicle component behaviors and messages. In another embodiment, the configuration level includes hardware and/or software part numbers. In another embodiment, the configuration level includes software revision information.

At step 204, telematics unit 120 receives vehicle code information from call center 170. At step 206, telematics unit 120 queries scan tool database (e.g. scan tool database 176) for recent vehicle code information. In one embodiment, the vehicle code information is software specific to MVCU 110. In another embodiment, the vehicle code information is base software applicable to any vehicle. At step 204, telematics unit 120 determines whether a diagnostics software upgrade is needed based on a comparison between the current configuration level data received from scan tool device 190 and vehicle code received from call center 170 scan tool database 176.

At step 207, telematics unit 120 determines whether a diagnostics software upgrade is available. If no diagnostics software upgrade is available, flowchart 200 terminates. At step 208, if a diagnostics software upgrade is available, telematics unit 120 sends an upgraded scan tool configuration data to scan tool device 190. In one embodiment, the upgraded scan tool configuration data is specific to the vehicle being serviced. In another embodiment, the upgraded scan tool configuration data is for more than one vehicle applications. For example, upgraded scan tool configuration data includes data that applies to a predetermined make or model, such as a line of pick-up trucks. In another example, upgraded scan tool configuration data includes data that applies to those vehicles of a particular make or model featuring a predetermined combination of options, such as pickup trucks with a V6 engine.

At step 306, an upgraded scan tool configuration data is offered to a technician or operator for scan tool device 190. At step 210, if the upgrade is accepted by a technician or operator, telematics unit 120 reprograms scan tool device 190. At step 308, scan tool device 190 is reprogrammed. Scan tool device 190 terminates flowchart 300 until another service event.

Figure 3:
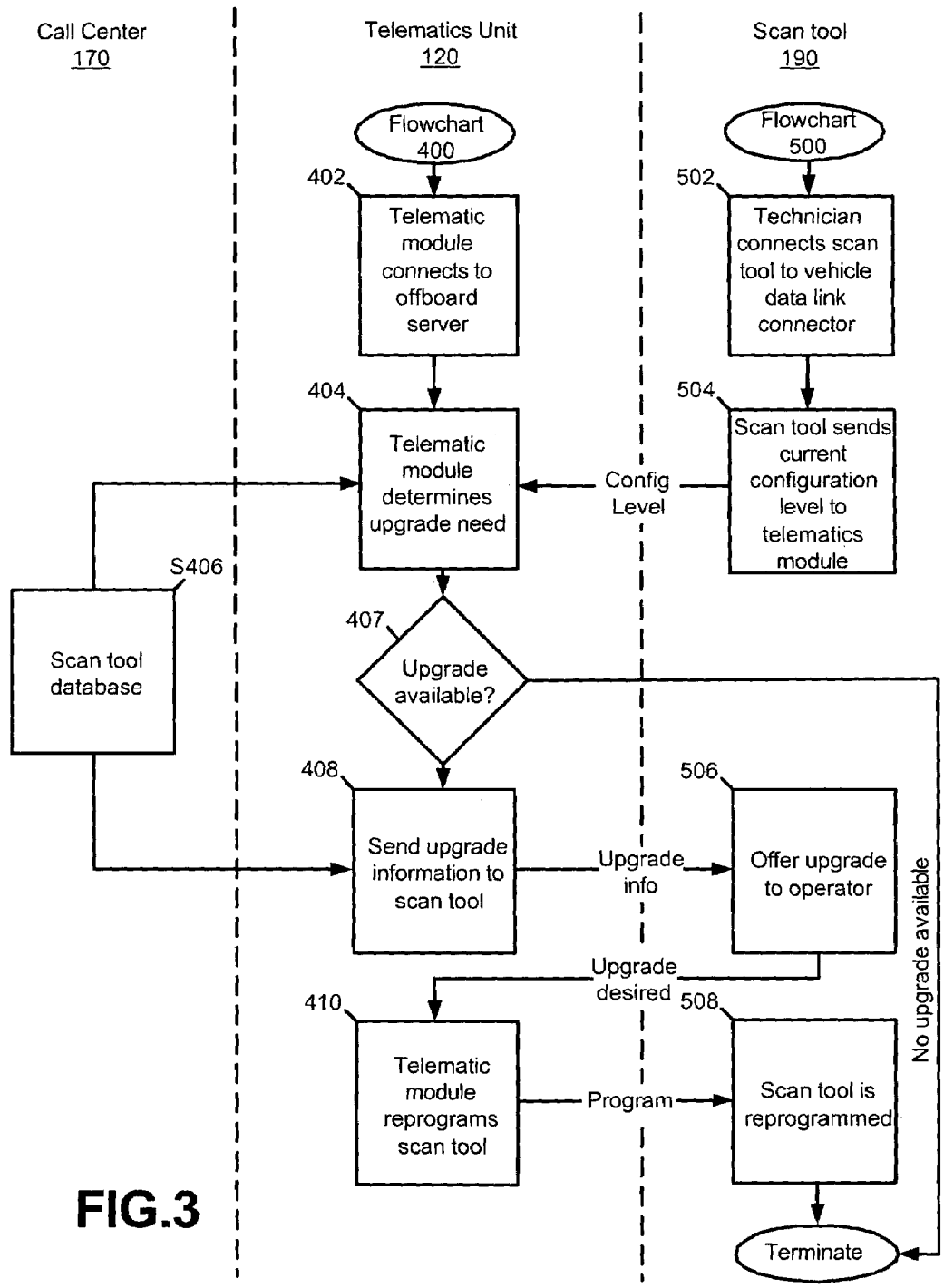
FIG. 3 is a flowchart representative of one embodiment of a method for updating vehicle diagnostics software in accordance with the present invention.

FIG. 3 illustrates a flowchart 400 and a flowchart 500 that are executed by telematics unit 120 and scan tool device 190, respectively, in implementing an automated diagnostics software update method of the present invention. While in practice, diagnostic software update process can be initiated by telematics unit 120 or scan tool device 190, flowcharts 400 and 500 will be described herein as if scan tool device 190 has initiated the service event. Flowchart 500 begins at step 502. In one embodiment, steps 502 and 504 are implemented as in steps 302 and 304 of FIG. 2.

At step 402, flowchart 400 monitors a wireless connection between a telematics module or telematics unit (e.g. telematics unit 120 of FIG. 1) and an off board server or call center (e.g. call center 170 of FIG. 1) for a data input. Monitoring a wireless connection is implemented as in step 202.

At step 404, telematics unit 120 receives vehicle code information from call center 170. At step 406, telematics unit 120 queries scan tool database (e.g. scan tool database 176) for recent vehicle code information. In one embodiment, steps 404 and 406 are implemented as in steps 204 and 206. At step 404, telematics unit 120 determines whether a diagnostics software upgrade is needed based on a comparison between the current configuration level data received from scan tool device 190 and vehicle code received from call center 170 scan tool database 176.

At step 407, telematics unit 120 determines whether a diagnostics software upgrade is available. If no diagnostics software upgrade is available, flowchart 400 terminates as implemented in step 207. At step 408, if a diagnostics software upgrade is available, telematics unit 120 sends an upgraded scan tool configuration data to scan tool device 190. Sending an upgraded scan tool configuration data is implemented as in step 208.

In one embodiment, steps 504 and 508 are implemented as in steps 304 and 308 of FIG. 2. At step 506, an upgraded scan tool configuration data is sent to scan tool device 190. Scan tool device 190 detects preferences is set to automatically accept upgraded scan tool configuration data. At step 410, telematics unit 120 reprograms scan tool device 190 as implemented in step 210. Scan tool device 190 terminates flowchart 500 until another service event.

From the preceding descriptions herein of flowcharts 200-500 as illustrated in FIGS. 2 and 3, those having ordinary skill in the art will appreciate various advantages of the present invention, such as, for example an elimination of a need for a technician or operator at service centers to manually upgrade scan tool devices from CDs mailed monthly. Furthermore, those having ordinary skill in the art will appreciate that, in practice, the automated method of updating vehicle diagnostics software with operator input to accept and the automated method of updating vehicle diagnostics software with automatic accept preference settings can be executed as described and illustrated herein, or merged into single diagnostics software update method.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of updating a scan tool, comprising the steps of:

receiving a scan tool configuration level supplied to a vehicle from a scan tool connected to the vehicle;

wirelessly connecting to a call center from the vehicle using a telematics unit on the vehicle;

accessing a scan tool database at the call center and determining whether a diagnostics software upgrade is needed by comparing the scan tool configuration level with information obtained from the scan tool database; and in response to determining that the diagnostics software upgrade is needed:

providing the diagnostics software upgrade from the call center to the vehicle via the telematics unit; and reprogramming the scan tool using the diagnostics software upgrade.

2. The method of claim 1, wherein the receiving step further comprises receiving the scan tool configuration level as data transmitted to the telematics unit from the scan tool via a data link connector.

3. The method of claim 1, wherein the accessing step further comprises sending the information to the telematics unit from the call center and determining whether the diagnostics software upgrade is needed by comparing the information and scan tool configuration level at the telematics unit.

4. The method of claim 1, wherein the reprogramming step further comprises querying a service technician about the diagnostics software upgrade via the scan tool and upgrading the scan tool if the technician accepts.

5. A method of updating a scan tool, comprising the steps of:

connecting a scan tool to a vehicle telematics unit via a data link connector;

sending current scan tool configuration level data from the scan tool to the vehicle telematics unit;

establishing a wireless connection between the telematics unit and a call center;

accessing information from a scan tool database at the call center;

sending the information from the call center to the telematics unit;

determining whether a diagnostics software upgrade is needed by comparing, at the telematics unit, the information with the current scan tool configuration level data;

providing the diagnostics software upgrade from the call center to the vehicle if the diagnostics software upgrade is determined to be needed; and reprogramming the scan tool using the diagnostics software upgrade.

6. The method of claim 5, wherein the sending step is initiated by the scan tool.

7. The method of claim 5, wherein the sending step is initiated by the telematics unit.

8. The method of claim 5, wherein the scan tool configuration level further comprises software revision information.

9. The method of claim 5, wherein the reprogramming step further comprises querying a service technician about the diagnostics software upgrade via the scan tool and upgrading the scan tool if the technician accepts.

\* \* \* \* \*